United States Patent
Mueller et al.

(10) Patent No.: US 6,783,681 B2
(45) Date of Patent: Aug. 31, 2004

(54) METHOD AND APPARATUS FOR TREATMENT OF DRINKING WATER

(75) Inventors: Paul Mueller, Monmouth, OR (US); Anthony G. Myers, Franklin, WI (US)

(73) Assignee: CH2M Hill, Inc., Englewood, CO (US)

( * ) Notice: Subject to any disclaimer, the term of this patent is extended or adjusted under 35 U.S.C. 154(b) by 153 days.

(21) Appl. No.: 09/991,478

(22) Filed: Nov. 9, 2001

(65) Prior Publication Data

US 2002/0121479 A1 Sep. 5, 2002

Related U.S. Application Data

(60) Provisional application No. 60/247,124, filed on Nov. 10, 2000.

(51) Int. Cl.[7] .......................... B01D 61/00; B01D 15/00
(52) U.S. Cl. ..................... 210/650; 210/663; 210/670; 210/636; 210/195.2; 210/257.2
(58) Field of Search .................. 210/650, 660, 210/195.2, 670, 663, 636, 257.2

(56) References Cited

U.S. PATENT DOCUMENTS

| | | |
|---|---|---|
| 3,996,131 A | 12/1976 | Conn |
| 4,329,225 A | 5/1982 | Davis et al. |
| 4,648,976 A | 3/1987 | Chen |
| 4,806,244 A | 2/1989 | Guilhem |
| 5,182,023 A * | 1/1993 | O'Connor et al. |
| 5,364,534 A | 11/1994 | Anselme et al. |
| 5,464,530 A | 11/1995 | Stivers |
| 5,595,666 A | 1/1997 | Kochen et al. |
| 5,639,377 A | 6/1997 | Banham et al. |
| 5,728,302 A | 3/1998 | Connor et al. |
| 6,020,210 A | 2/2000 | Miltenyi |
| 6,027,649 A | 2/2000 | Benedek et al. |
| 6,120,688 A | 9/2000 | Daly et al. |

FOREIGN PATENT DOCUMENTS

| | | |
|---|---|---|
| DE | 3938245 A1 | 5/1991 |
| EP | 0 781 255 B1 | 7/2000 |
| JP | 59-49851 A | 3/1984 |
| JP | 60-132609 A | 7/1985 |

OTHER PUBLICATIONS

Drikas et al. (2002) Water, Science and Technology: Water Supply 2:71–79.

* cited by examiner

*Primary Examiner*—Ana Fortuna
(74) *Attorney, Agent, or Firm*—Swanson & Bratschun LLC

(57) ABSTRACT

An apparatus and method for the treatment and purification of drinking water combines the use of an ion-exchange resin and a membrane filter (12) in a single process tank. The ion-exchange resin is removed from the process tank (14) and regenerated for reuse.

20 Claims, 7 Drawing Sheets

METHOD AND APPARATUS FOR TREATMENT OF DRINKING WATER

RELATED APPLICATIONS

This application claims the benefit of U.S. Provisional Patent Application Ser. No. 60/247,124, filed Nov. 10, 2000, incorporated herein by reference.

TECHNICAL FIELD

The present invention is directed to a method and apparatus for the treatment of drinking water, and more particularly to a treatment process utilizing a regeneratable ion-exchange resin in combination with an immersed membrane filter in a single process tank.

BACKGROUND OF THE INVENTION

Treatment and purification of raw water in order to make it suitable for drinking can be accomplished by a number of methods. The specific contaminants of a given water stream may lend itself to the use of a particular treatment. Ion-exchange resins are used in water treatment systems in order to remove dissolved compounds, some of which are organic. Microfiltration and Ultrafiltration membranes are used to remove particulates. For a water stream that contains both these components, one treatment must be used, followed by the second. The need for two separate steps is time-consuming, requires additional equipment, and increases the overall cost of the treatment system. Accordingly, there remains a need for an improved drinking water treatment system that can remove particulates and dissolved organic compounds and which is cost- and time-effective compared to present systems.

Benedek, U.S. Pat. No. 6,027,649, discloses the treatment of drinking water in a single reactor tank using a ZEWEED® submerged membrane filter in conjunction with a flocculent mixed in the reactor tank and maintained in suspension by use of an air bubbler. The flocculent is intended to remover organics, color, bacteria, cysts and other impurities. Use of the flocculent taught by Benedek requires maintaining pH in a range from 5–9. This may require addition of acids or bases to a raw water supply to maintain the necessary pH range. While Benedek teaches a single tank using a flocculent in combination with a membrane filter, use of the flocculent for organic removal requires subsequent disposal of the spent flocculent. Thus, not only must suitable disposal for the spent flocculent be arranged, new coagulants must be provided to the reactor tank to form the necessary flocculent. Benedek also discusses the desirability of adding activated carbon to the reactor tank for the removal of dissolved organics. However, as with the flocculent, this creates disposal problems for spent activated carbon and requires replenishment of the reactor tank with new activated carbon.

Daly, U.S. Pat. No. 6,120,688, is directed to a water purification method also utilizing a ZEWEED® membrane filter. More particularly, Daly teaches initial particulate removal using the ZEWEED® filter followed by application of reverse osmosis to the filtered water. While Daly eliminates the disposal problems associated with the flocculent and activated carbon of the Benedek patent, the Daly patent requires a two step treatment process which increases plant size and cost requirements.

The present invention is directed to overcoming one or more of the problems discussed above.

SUMMARY OF THE INVENTION

The first aspect of the present invention is a method for treating drinking water. Raw water is provided to a process tank. An ion-exchange resin is added to the process tank to form a raw water/ion-exchange resin mixture. Treated water is removed from the process tank through a membrane filter. The ion-exchange resin is preferably a magnetic ion-exchange resin. This magnetic ion-exchange resin is separated from the raw water/ion-exchange resin mixture using a high gradient magnetic filter. The separated ion-exchange resin is then preferably regenerated and then re-supplied to the process tank. The ion-exchange resin may be regenerated in an external counter current column. Alternatively, the regeneration step is performed in the process tank by adding a saline solution to the process tank. Thereafter, the regenerated ion-exchange resin is separated from the raw water/regenerated ion-exchange resin mixture.

Another aspect of the present invention is an apparatus for treating drinking water. The apparatus includes a process tank for receiving a raw water. An ion-exchange resin supply is operatively associated with the process tank to provide ion-exchange resin to the raw water within the process tank. A membrane filter is operatively associated with the process tank for separating particulate matter from treated water removed from the process tank through the membrane filter. The apparatus may also include a resin separator operatively associated with the process tank for removing ion-exchange resin from an ion-exchange resin/raw water mixture. In this embodiment the ion-exchange resin is preferably a magnetic ion-exchange resin and the resin separator is preferably a high gradient magnetic filter. A resin regenerator preferably receives the removed ion-exchange resin from the separator to regenerate the ion-exchange resin through the use of a saline solution. A conveyer is then preferably provided for conveying the regenerated ion-exchange resin to the ion-exchange resin supply. The resin regenerator may be an external counter current column using a saline solution to regenerate the ion-exchange resin. In a highly preferred embodiment, an aerator is provided in the process tank for agitating an ion-exchange resin/raw water mixture in the process tank.

The apparatus and method for treatment of drinking water of the present invention combines two separate treatment technologies in a single tank for removing dissolved contaminants and particulates in a single treatment process. The apparatus and method uses an ion-exchange resin which can be separated from a raw water/ion-exchange resin mixture and then regenerated for reuse. This process both extends the useful life of the ion-exchange resin and minimizes waste generation and disposal problems that have plagued prior art water treatment systems.

DETAILED DESCRIPTION OF THE PREFERRED EMBODIMENTS

Figure 1:
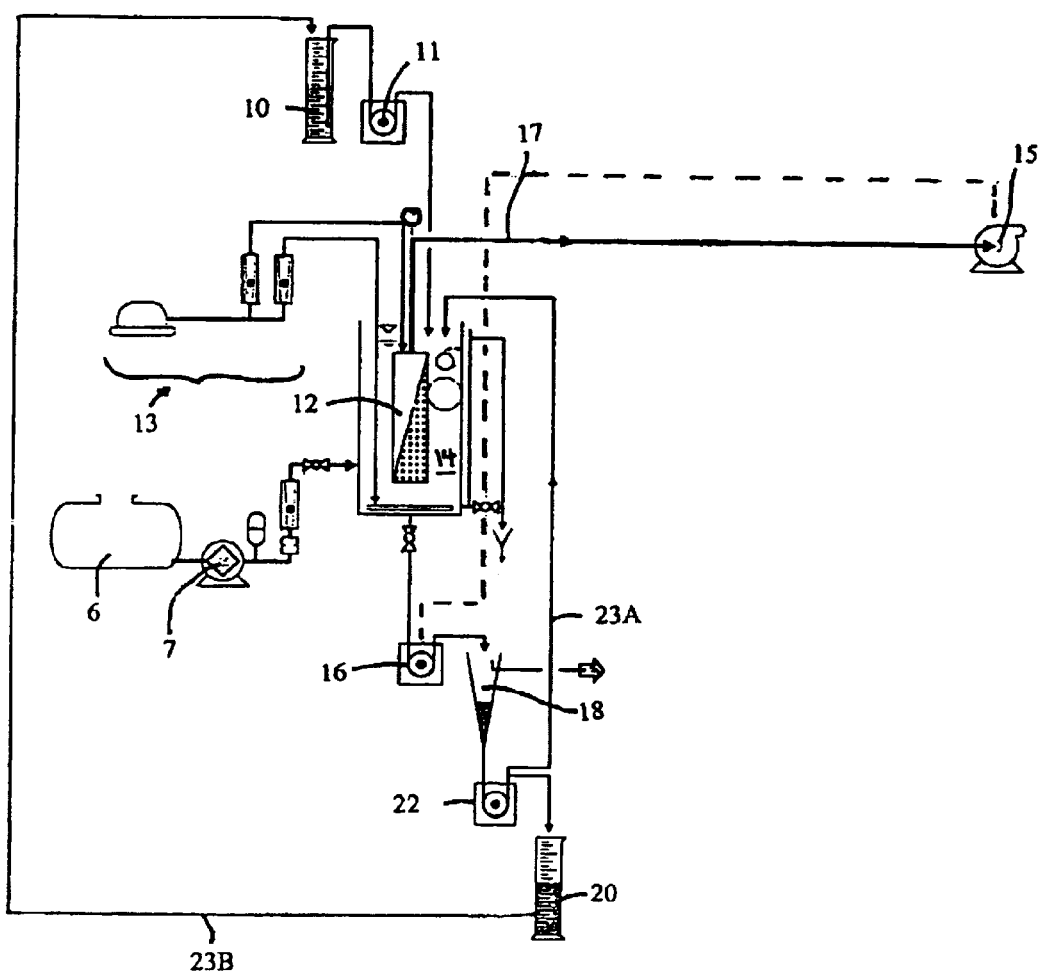
FIG. 1 is a schematic of the drinking water treatment system according to the present invention.
Figure 2:
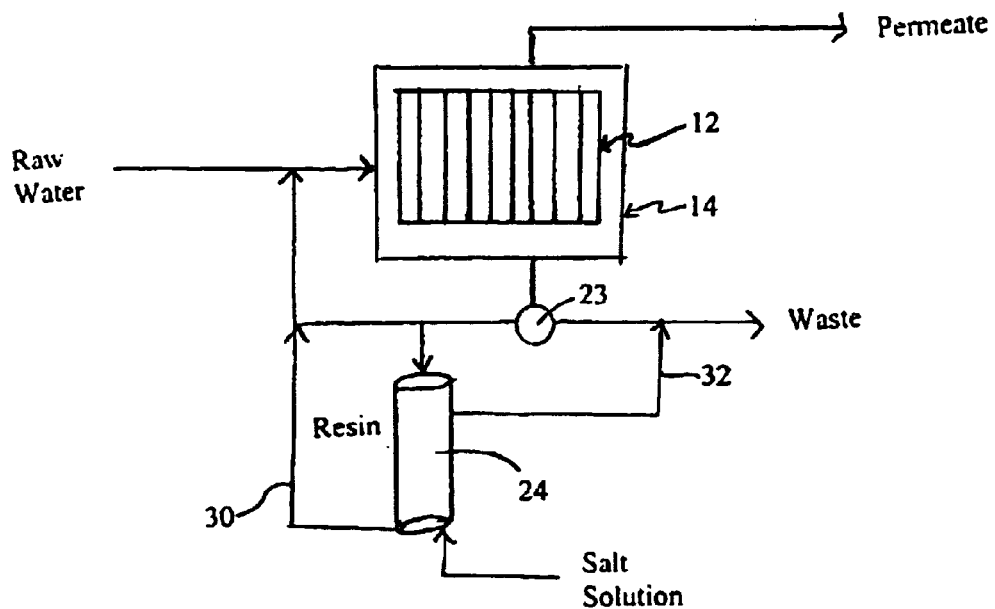
FIG. 2 is a simplified schematic of an embodiment of the present invention wherein regeneration of the resin is accomplished by a countercurrent column.
Figure 3:
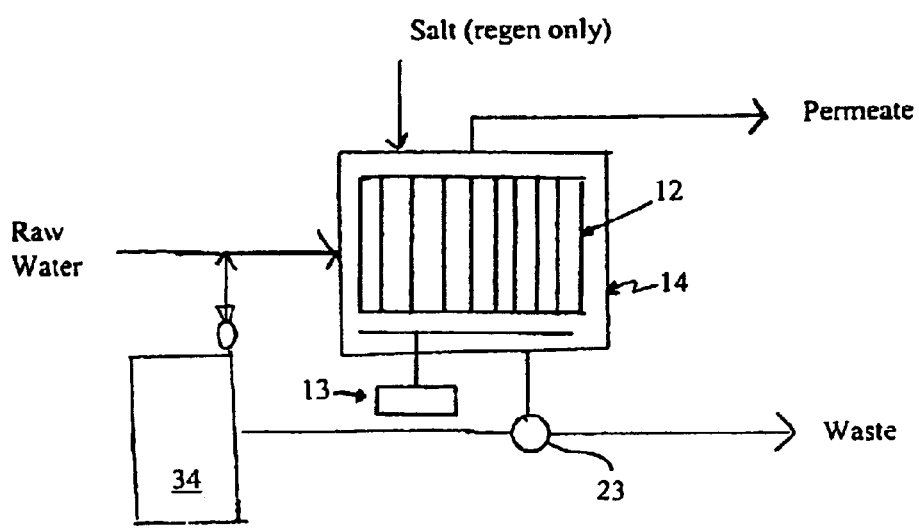
FIG. 3 is a simplified schematic of an embodiment of the present invention wherein regeneration of the resin is accomplished in the process tank.

The drinking water treatment process of the present invention combines two separate technologies to remove natural organic material and particulates in a single treatment process. Schematics of this process are shown in FIGS. 1, 2, and 3. With reference to FIG. 1, raw water from raw water tank 6 is introduced to a process tank 14 under force of gravity or a pump 7. An adsorbent ion-exchange resin from a resin storage container 10 is added via a pumping system 11 to the process tank 14 which contains a submerged membrane filter 12. A suitable submerged filter is the ZEEWEED® membrane (ZENON Environmental, Inc., Ontario, Canada). The ion-exchange resin removes dissolved natural organic material from the water and the membrane filter removes particulates. The tank 14 is mixed via aeration by an aeration system 13 to suspend the ion-exchange resin. Treated water is extracted through hollow fiber membranes of the membrane filter 12 using applied vacuum (outside/in) from pump 15 applied to line 17, at which point the treated water can be disinfected, stored, and distributed.

Ion-exchange resins have a finite capacity for adsorbing materials. When this capacity has been reached, the resin must be discarded or regenerated. A high concentration of ion-exchange resin builds up in the process tank 14 during the treatment process and can be removed via gravity, or a pump 16. The used ion-exchange resin is then conveyed to resin separator 18, where it is extracted from the residual water. The ion-exchange resin is then be regenerated in a regeneration reservoir 20. Typically, regeneration is accomplished by treatment with a high concentration salt solution. Regenerated resin may be returned to the process tank 14 by a return pump 22 via line 23A or conveyed to resin storage container 10 via line 23B.

In a preferred embodiment, the ion-exchange resin is a magnetic ion-exchange resin, such as MIEX® DOC manufactured by Orica Watercare, Melbourne, Australia. Preferably, about 20 mL MIEX® DOC resin per liter of water is used. In this case, the resin may optionally be removed from the membrane filter tank by using a high-gradient magnetic filter (HGMF) 23 (shown only in FIGS. 2 and 3, but which could also be part of the system shown in FIG. 1) which separates the resin from the water and other particles in the tank.

Referring to FIG. 2, in a further embodiment, regeneration of the resin is accomplished by a counter-current column 24 where a salt solution is pumped up through the column to remove organic material from the resin. The regenerated resin is removed from the bottom of the column and can be placed back into the process tank via line 30. Salt waste is disposed through line 32.

Referring to FIG. 3, in yet another embodiment, the membrane filter cell is isolated, salt is added, and mixed with air from air mixing system 13 for regeneration. At this point the solution in the tank is removed and passed through the HGMF 23 to a resin storage tank 34.

In all cases, regenerated resin is returned to the membrane tank influence and the waste salt water is disposed of appropriately.

Because the ion-exchange resin of a preferred embodiment is magnetic, it tends to clump together and settle in the process tank 14. To overcome this tendency, an air-mixing system 13 keeps the magnetic ion-exchange resin in suspension. This air-mixing system allows for significantly higher concentrations of resin in the process tank. A suitable aeration device is a SWEETWATER® Linear Piston Air Pump, available from Aquatic Eco-Systems, Inc., Apopka, Fla.

Figure 4:
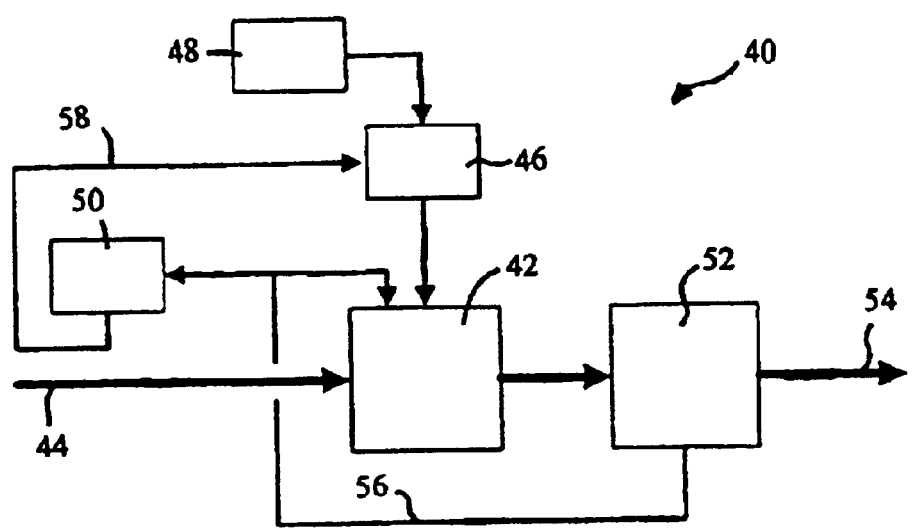
FIG. 4 is a schematic showing a basic water treatment process.

In order to further optimize the system, a mathematical model expressed as a mass balance on resin was developed to determine retention time and adsorbent concentration in the process tank using the ZEEWEED® membrane and MIEX® DOC resin. For comparison purposes, a basic treatment process using only MIEX® DOC resin and no membrane was also modeled (hereinafter "basic process"). The values applied for the basic process are shown in Table 1, the model values are shown in Table 2, and a schematic shown in FIG. 4. The basic process 40 includes a process or contact tank 42 to which raw water is added through conduit 44 and an ion-exchange resin is added from a resin feed 46. The resin feed 46 receives virgin resin from a virgin resin supply 48 and regenerated resin from a regenerator 50. Separator 52 is provided to separate ion-exchange resin from the raw water following suitable retention in the process tank, with treated water being output through conduit 54. Separated ion-exchange resin is conveyed through conduit 56 to the regenerator 50 and regenerated resin is delivered to the resin feed through conduit 58.

The amount of treated water, TW, per day, 1 million gallons, or 3,785,000 liters, is the same as the amount of raw water, RW, into the system, and water out of the tank, OF. The separator underflow, SU, is the amount of water leaving the separator, and is the outflow from the tank times the resin concentration, less the amount taking into account resin loss, given a 30% concentration of resin (v/v), or $SU=(OF*RC-OF*RC*RL)/0.3$. The resin sent to regeneration, RG, is the amount of outflow times the resin concentration times the amount percent underflow to regeneration, less the amount for resin loss, or $RG=OF*RC*U-OF*RC*U*RL$. Recycled resin, RR, goes from the separator back to the contact tank and is the outflow times the resin concentration less the amount for resin loss, less the amount sent to regeneration, or $RR=OF*RC-OF*RC*RL-RG$. The amount of regenerated resin that goes back into the resin feed is equal to the amount of recycled resin. Fresh resin fed into the tank is a combination of virgin resin and regenerated resin. Fresh resin, FR, corresponds to the amount of resin that must be added to compensate for the amount of resin in stages other than the process tank, or $FR=OF*RC-RR$. Virgin resin, VR, corresponds to the total amount of resin that must be added to compensate for resin loss, or $VR=OF*RL$.

Resin Contact Time at Regeneration, $CT_R$, is the concentrate times resin concentration, taking into account the resin loss and the to underflow sent to regeneration or $RC_R=RI/[OF*RC-OF*RC*(1-RL)*U]$. Resin Inventory in Contact Tank, RI, is amount of treated water in the contact tank times the contact time, CT, times the resin retention time, or $RI=RW*CT*RT$. Bed Volumes Treated at Regeneration, BV, is the resin contact time at regeneration times the amount of raw water divided by the resin inventory in the contact tank, or $BV=RC_R*RW/RI$. Resin Retention Time, RT, is the resin inventory in the contact tank divided by the product of the outflow, resin loss, and resin concentration, or $RT=RI/(OF*RL*RC)$.

TABLE 1

Values used in model of basic process.

| Variable | Designation | Value |
|---|---|---|
| Contactor Resin Concentration | RC | 6 mL/L |
| Contact Time | CT | 30 minutes |
| % Underflow to Regeneration | U | 10% |
| Resin Loss at Separator | RL | 0.10% |
| Process Flow | OF, RW, TW | 1 million gallons/day |

TABLE 2

Model of basic process.

| Flow Stream | Flow L/day | Resin Concentration % v/v | Daily Resin @ 100% L/day |
|---|---|---|---|
| 1 Raw Water | 3,785,000 | 0 | 0 |
| 2 Resin Feed | 2,291 | 100 | 2,291 |
| 3 Contact Tank Outflow | 3,785,000 | 0.60 | 22,710 |
| 4 Separator Underflow | 75,624 | 30 | 22,687 |
| 5 Treated Water | 3,785,000 | 0.0006 | 23 |
| 6 Resin to Regen | 2,269 | 100 | 2,269 |
| 7 Recycle Resin | 20,419 | 100 | 20,419 |
| 8 Regenerated Resin | 20,419 | 100 | 20,419 |
| 9 Virgin Resin | 23 | 100 | 23 |

Figure 5:
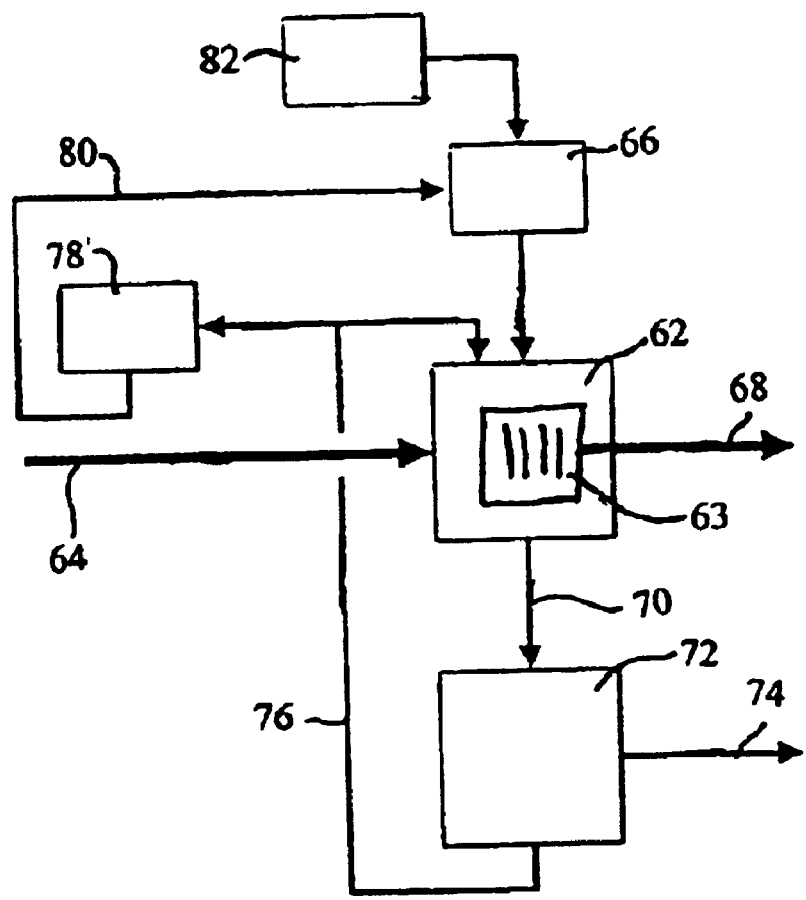
FIG. 5 is a schematic showing the membrane/resin process of the present invention.

The model using the values in Table 3 was applied to the process of the present invention using a membrane and magnetic ion-exchange resin (hereinafter membrane/resin process). The model values are shown in Table 4, and a schematic is shown FIG. 5. Briefly, schematic 5A illustrates a membrane process tank 62 including a membrane filter 63. Raw water enters the membrane process tank through conduit 64 where it is mixed with resin from resin feed 66. Water drawn through the membrane filter 63 exits as treated water at conduit 68. An ion-exchange resin/raw water mixture is drawn from the membrane process tank through conduit 70 to resin separator 72. Waste water is removed at conduit 74 for suitable disposal. The separated resin is conveyed through conduit 76 to the regenerator 78 for regeneration. Regenerated resin is conveyed through conduit 80 to the resin feed 66 where it may be mixed or supplemented with virgin resin from the virgin resin supply 82.

The model is based on a treated water flow TW of 1 million gallons per day or 3,785,000 L/day. Concentrate flows from the process tank to the resin separator. Concentrate is defined as the amount the treated water times the amount lost through the membrane recovery, MR, or, $C=TW*(1-MR)$. Raw water into the tank is 3,785,000 L/day plus the amount of concentrate C that is recycled. Treated concentrate, TC is removed from the system and is the amount of resin lost from the concentrate, or $TC=C*RC*RL$. Separator underflow is the water leaving the resin separator. Separator underflow SU is the concentrate sent to the resin separator times the resin concentration, taking into account the amount of resin lost, and given a 30% volume/volume concentration of resin, or $SU=[C*RC*(1-RL)]/0.3$. The separator underflow is split into two parts, the resin to regeneration, RG, and the resin recycled to the process tank, RR. RG is the resin in the concentrate, accounting for resin loss and the underflow sent to regeneration, U, or $RG=C*RC*(1-RL)*U$. Recycled resin RR is the separator underflow less the resin to regeneration, or $RR=C*RC*(1-RL)-(C*RC*U)]-RG$. Regenerated resin sent to resin feed is the same as resin to regeneration, RG. Fresh resin fed into the tank is a combination of virgin resin and regenerated resin. Fresh resin, FR, corresponds to the amount of resin that must be added to compensate for the amount of resin in stages other than the process tank, or $FR=C*RC-RR$. The amount of virgin resin in, VR, corresponds to the total amount of resin in stages of the process other than the process tank less the amount regenerated resin, or $VR=FR-RG$. Resin Contact Time at Regeneration, $CT_R$, is the resin inventory in the contact tank divided by concentrate times resin concentration, taking into account the resin loss and the underflow sent to regeneration or $RC_R=RI/[C*RC*(1-RL)*U]$. Resin Inventory in Contact Tank, RI, is amount of raw water in the contact tank times the contact time, CT, times the resin retention time, or $RI=RW*CT*RT$. Bed Volumes Treated at Regeneration, BV, is the resin contact time at regeneration times the amount of treated water divided by the resin inventory in the contact tank, or $BV=CT_R*TW/RI$. Resin Retention Time, RT, is the resin inventory in the contact tank divided by the treated concentrate, or $RT=RI/TC$.

TABLE 3

Values used in membrane/resin process

| Variable | Designation | Value |
|---|---|---|
| Process Tank Resin Concentration | RC | 25 mL/L |
| Contact Time | CT | 12 min. |
| % underflow to regeneration | U | 40% |
| Resin Loss | RL | 0.10% |
| Membrane Process Recovery | MR | 95% |
| Treated Water Flow | TW | 1 million gallons/day |

TABLE 4

Model of membrane resin process.

| Flow Stream | Flow (L/day) | Resin Concentration (% v/v) | Daily Resin @ 100% (L/day) |
|---|---|---|---|
| 1 Raw Water | 3,974,250 | 0 | 0 |
| 2 Resin Feed | 1,895 | 100 | 1,895 |
| 3 Concentrate | 189,250 | 2.5 | 4,731 |
| 4 Separator Underflow | 15,755 | 30 | 4,727 |
| 5 Treated Water | 3,785,000 | 0 | 0 |
| 6 Resin to Regen | 1,891 | 100 | 1,891 |
| 7 Recycle Resin | 2,836 | 100 | 2,836 |
| 8 Regenerated Resin | 1,891 | 100 | 1,891 |
| 9 Virgin Resin | 5 | 100 | 5 |
| 10 Treated Concentrate | 5 | 100 | 5 |

A comparison of the results of the two processes in Table 5 indicates the improvements of the process of the present invention.

TABLE 5

Comparison of results from basic and membrane/resin process.

| Variable | Designation | Basic Process | Membrane/Resin Process |
|---|---|---|---|
| Resin Contact Time at Regeneration (hrs) | $CT_R$ | 5 | 10.5 |
| Bed Volumes Treated at Regeneration | BV | 1,668 | 2,002 |
| Resin Inventory in Contact Tank (L) | RI | 473 | 828 |
| Resin Retention Time (days) | RT | 21 | 175 |
| Fresh Resin Dose (mL/L) | FR | 0.61 | 0.50 |
| Virgin Resin Dose (mL/L) | VR | 0.0060 | 0.0012 |

The resin contact time at Regeneration is increased from 5 hrs to 10.5 hrs. The number of bed volumes treated at the regeneration step is also increased from 1,668 to 2,002. The resin inventory in contact tank is greatly increased from 473 L to 828 L. Because the design of the system allows the resin to be recycled multiple times, the contact time for the resin will be significantly higher than the hydraulic residence time, HRT—the amount of time that water being treated resides in the treatment system. Resin retention time is also greatly increased from 21 days to 175 days. At the same time, the amount of fresh resin dose is decreased from 0.61 mL/L to 0.50 mL/L, and the amount of virgin resin dose is also decreased from 0.0060 mL/L to 0.0012 mL/L.

Figure 6A:
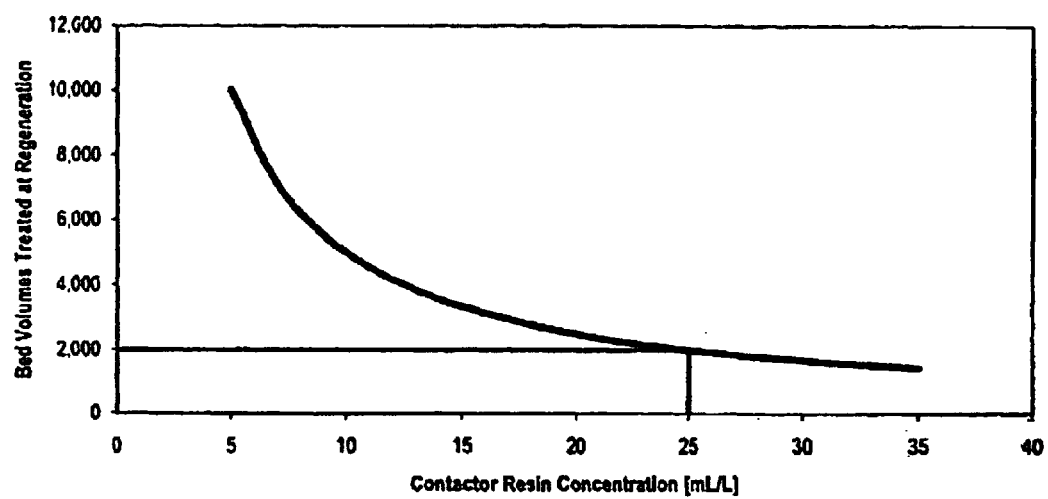
FIG. 6A is a graph showing the Effect of Controlling the Contactor Resin Concentration on the Bed Volumes Treated at Regeneration, applying a mathematical model to the proposed process as depicted in FIG. 1.
Figure 6B:
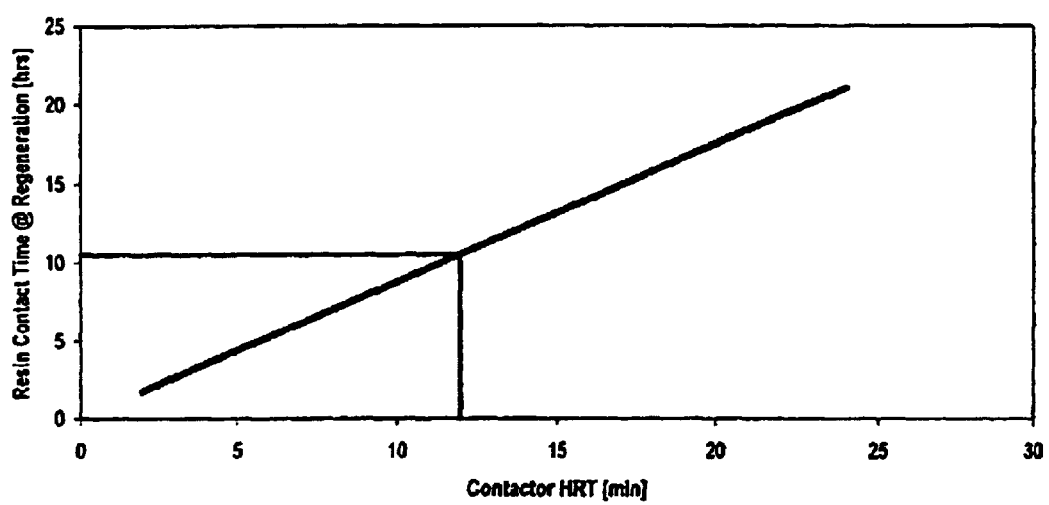
FIG. 6B is a graph showing the Effect of Controlling the Contactor Hydraulic Residence Time on the resin contact Time at Regeneration, applying the mathematical model to the proposed process as depicted in FIG. 1.
Figure 6C:
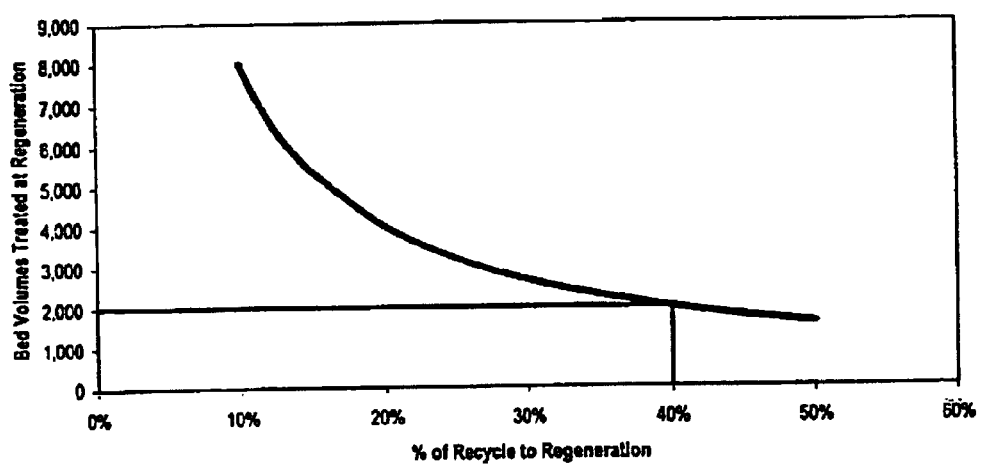
FIG. 6C is a graph showing the Effect of Controlling Resin Recycle on the Bed Volumes Treated at Regeneration, applying the mathematical model to the proposed process as depicted in FIG. 1.

The outputs of the membrane/resin process model, when inputs are varied, are also depicted in FIGS. 6A, 6B, and 6C. FIG. 6A shows the effect of controlling the contactor resin concentration on the bed volumes treated at regeneration. FIG. 6B is a graph showing the effect of controlling the contactor HRT on the resin contact time at regeneration. FIG. 6C is a graph showing the effect of controlling resin recycle on the bed volumes treated at regeneration.

Arrangements using some or all of the advantageous principles of the present invention may be applied in a wide variety of specific systems. The water treatment systems of FIGS. 1, 2, and 3 are typical and illustrative, and not to be regarded as limiting the scope of the invention or manner in which it may be practiced.

What is claimed is:

1. A method for treating drinking water comprising:
    a) providing raw water to a process tank;
    b) adding an ion-exchange resin to the process tank to form a raw water/ion-exchange resin mixture;
    c) removing treated water from the process tank through a membrane filter, wherein said process tank contains said membrane filter; and
    d) regenerating the ion-exchange resin in the process tank.

2. The method of claim 1 wherein the ion-exchange resin is a magnetic ion-exchange resin.

3. The method of claim 1 further comprising agitating the raw water/ion-exchange resin mixture sufficiently to maintain the ion-exchange resin in suspension.

4. The method of claim 1 wherein step (d) comprises adding a regenerant to the process tank.

5. The method of claim 4 comprising separating regenerated ion-exchange resin from the regenerant.

6. The method of claim 5 wherein following separating the regenerated ion-exchange resin from the regenerant, the regenerated ion-exchange resin is added to the process tank in step (b).

7. The method of claim 4 the ion-exchange resin is a magnetic ion-exchange resin, the method further comprising separating the ion-exchange resin from the regenerant using high a gradient magnetic filter.

8. The method of claim 4 wherein the regenerant is a saline solution.

9. A method for treating drinking water comprising:
    a) providing raw water to a process tank;
    b) adding a magnetic ion-exchange resin to the process tank to form a raw water/magnetic ion-exchange resin mixture;
    c removing treated water from the process tank through a membrane filter, wherein said process tank contains said membrane filter; and
    d) separating the magnetic ion-exchange resin from the raw water/magnetic ion-exchange resin mixture using a high gradient magnetic filter.

10. The method of claim 9 further comprising regenerating the magnetic ion-exchange resin.

11. The method of claim 10 further comprising providing the regenerated magnetic ion-exchange resin to the process tank.

12. The method of claim 10 wherein the regenerating step is performed in an external counter current column.

13. The method of claim 10 wherein the regenerating step is performed in the process tank by adding a regenerant to the process tank.

14. The method of claim 9 wherein the regenerant is a saline solution.

15. An apparatus for treating drinking water comprising:
    a process tank for receiving raw water;
    an ion-exchange resin supply operatively associated with the process tank to provide ion-exchange resin to raw water within the process tank;
    a membrane filter operatively associated with the process tank and contained within the process tank for separating particulate matter from treated water removed from the process tank through the membrane filter; and
    a regenerant supply operatively associated with the process tank, the regenerant supply providing regenerant for regeneration of the ion-exchange resin within the process tank.

16. The apparatus of claim 15 further comprising a resin separator in selective liquid communication with the process tank for recovering regenerated ion-exchange resin from an ion-exchange resin/regenerant solution mixture.

17. The apparatus of claim 16 wherein the ion-exchange resin is a magnetic ion-exchange resin and the resin separator is a high gradient magnetic filter.

18. The apparatus of claim 16 further comprising means for conveying regenerated ion-exchange resin from the resin separator to the ion-exchange resin supply.

19. The apparatus of claim 15 further comprising an aerator in the process tank for agitating the contents of the process tank.

20. The apparatus of claim 15 wherein the regenerant is a saline solution.

* * * * *